Patented Aug. 25, 1936

2,052,278

UNITED STATES PATENT OFFICE 2,052,278

FLUXING COMPOSITION

Conral C. Callis and Ralph B. Derr, Oakmont, Pa., assignors to Aluminum Company of America, Pittsburgh, Pa., a corporation of Pennsylvania No Drawing. Continuation of application Serial No. 639,842, October 27, 1932. This application October 24, 1934, Serial No. 749,818

4 Claims. (Cl. 148—23)

This invention relates to methods and fluxes for use in the joining of metals by soldering, and particularly to fluxes for use in the soldering of easily oxidizable metals, such as aluminum and its alloys.

Such fluxes as are used in the soldering of easily oxidizable metals usually contain halogen compounds of metals, such as zinc chloride, or other halogen compounds which can be broken down by the heat of the soldering operation, releasing the halogens which presumably combine with the oxide normally present on the material to be soldered, removing the oxide and leaving a clean metal surface to which the solder will adhere. All of the halogens (fluorine, chlorine, bromine and iodine) have been used in fluxes, and most fluxes contain mixtures of two or more of these halogens in combined form to secure certain desirable characteristics in the flux, such as low melting point, freedom from dross, and rapid and efficient fluxing action.

In prior soldering fluxes in which it was desired to utilize the fluxing action of fluorine, the fluorine was generally introduced into the flux as a fluoride. The previously used fluorides, sodium fluoride, sodium aluminum fluoride, etc., invariably constituted residue-forming constituents in the flux. This residue-forming characteristic seriously interfered with the soldering operation and further, upon completion of the soldering operation the residue appeared on the soldered joint or as an inclusion in the solder. Under these conditions, unless the residue could be removed by a thorough cleaning operation the joint was subjected to violent corrosive action caused by the residue in the presence of moisture.

We have found that when fluorine is introduced into a flux in the form of a fluoride characterized in that when heated in the presence of aluminum to soldering temperatures it reduces to a metal base or is volatilized completely, the fluxing action of the mixture is greatly improved without any of the detrimental effects characterizing the use of prior compounds. However, when fluorides of this class are included in fluxes, the quantity must be carefully limited. It appears that when large amounts of fluorine are present during the soldering operation, the fluorine combines either with the metal being soldered or its oxide, in some manner replacing the oxide coating with a coating of fluoride; thus, when considerable cadmium fluoride or ammonium fluoride are used in a soldering flux on an aluminum surface the aluminum oxide normally present on the surface is removed but its place is taken by the aluminum fluoride.

We have also found that this fluoride coating, when formed, is more difficult to solder through than the oxide coating which the fluorine removed. The result is, therefore, that although one detrimental agent has been removed by the flux, an agent which is just as detrimental, if not more so, remains. If, however, the total fluorine in the flux does not exceed 4 per cent by weight of the total flux mixture it will assist in the removal of the oxide film from the surface of aluminum or aluminum alloys without forming on the aluminum surface a detrimental coating of aluminum fluoride. While the action of such fluxes is not readily explained it seems probable, in view of our observations, that when the total fluorine does not exceed 4 per cent by weight of the total flux mixture the fluoride coating is not formed at all. In such fluxes as we have described, the amount of fluorine should be at least about 0.1 per cent by weight of the total flux in order to be effective. In practice we have found it desirable in ordinary soldering operations to use a flux containing fluorine in amounts equal to about 0.1 to 2.5 per cent by weight of the total flux mixture. As previously stated, the fluorine should be added in the form of a fluoride characterized in that when heated in the presence of aluminum to soldering temperatures any residue remaining is substantially free from non-metallic compounds containing the base of said added fluoride. The term "non-metallic compounds" as used herein and in the appended claims signifies compounds other than those formed between two or more metals but includes non-metallic substances or compounds which may contain a metallic base such as, for example, sodium fluoride. Thus, the term excludes metal alloys such as antimony-cadmium alloys which might be formed, for example, where both antimony fluoride and cadmium fluoride are used in the same flux. Preferred fluorides are antimony fluoride, cadmium fluoride and ammonium fluoride.

Other salts which are used in our preferred flux compositions are shown in our Patent No. 1,960,239, granted May 29, 1934 on an application which was copending with the application of which the present application is a continuation. In their preferred forms such fluxes may consist, for example, of mixtures of stannous bromide, cadmium chloride, cadmium iodide, ammonium chloride, zinc chloride, or zinc bromide, to which we add approximately 1 per cent of fluorine in the form of ammonium fluoride. A flux composition which we have found to have general application with all solders in common use consists, for example, of 28 per cent by weight of stannous bromide, 30 per cent by weight of cadmium chloride, 10 per cent by weight of cadmium iodide, 25 per cent by weight of ammonium chloride, 5 per cent by weight of zinc chloride or zinc bromide or a mixture of zinc bromide and zinc chloride, and 2 per cent by weight of ammonium fluoride. A mixture of these salts in the above proportions is highly satisfactory as a flux when used as such or it can be used in the form of a paste or liquid by mixing with vehicles, examples of which are given in our copending application, Serial No. 649,325, filed December 29, 1932, issued April 2, 1935, Patent No. 1,996,362. One such mixture is composed of chlorinated diphenyl, chlorinated naphthalene and para-dichlor-benzene. The salt flux is usually mixed with the vehicle in the proportion of about 4 parts of the salts to about 6 parts of the vehicle.

Various examples are given hereinabove in order that the operation of our invention may be readily comprehended, but it is to be understood that these examples are given by way of illustration only and not as limitations and that our invention may be variously embodied within the scope of the appended claims.

This application is a continuation of our application Serial No. 639,842, filed October 27, 1932.

We claim:

1. A soldering flux of the type described in which 0.1 to 4.0 per cent by weight of the total flux mixture consists of fluorine present in the form of a fluoride characterized in that upon heating to soldering temperatures any residue remaining is substantially free from non-metallic compounds containing the base of said added fluoride and said flux being substantially free from other fluorides.

2. A soldering flux of the type described in which 0.1 to 2.5 per cent by weight of the total flux mixture consists of fluorine present in the form of a fluoride characterized in that upon heating to soldering temperatures any residue remaining is substantially free from non-metallic compounds containing the base of said added fluoride and said flux being substantially free from other fluorides.

3. A soldering flux of the type described containing a material from the class consisting of ammonium fluoride, antimony fluoride and cadmium fluoride, the fluorine content of said material constituting 0.1 to 4.0 per cent by weight of the total flux mixture and the entire fluorine content of said flux.

4. A soldering flux of the type described containing a material from the class consisting of ammonium fluoride, antimony fluoride and cadmium fluoride, the fluorine content of said material constituting 0.1 to 2.5 per cent by weight of the total flux mixture and the entire fluorine content of said flux.

CONRAL C. CALLIS.
RALPH B. DERR.